(12) United States Patent
Saxena et al.

(10) Patent No.: US 10,922,316 B2
(45) Date of Patent: Feb. 16, 2021

(54) USING COMPUTING RESOURCES TO PERFORM DATABASE QUERIES ACCORDING TO A DYNAMICALLY DETERMINED QUERY SIZE

(71) Applicant: Amazon Technologies, Inc., Seattle, WA (US)

(72) Inventors: Gaurav Saxena, Cupertino, CA (US); George Constantin Caragea, Redwood City, CA (US); Naresh Kishin Chainani, Mountain View, CA (US); Martin Grund, Lafayette, CA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 16/007,697

(22) Filed: Jun. 13, 2018

(65) Prior Publication Data
US 2019/0384845 A1 Dec. 19, 2019

(51) Int. Cl.
  *G06F 16/00* (2019.01)
  *G06F 16/2453* (2019.01)
  *G06F 16/28* (2019.01)

(52) U.S. Cl.
  CPC ...... *G06F 16/24545* (2019.01); *G06F 16/283* (2019.01)

(58) Field of Classification Search
  CPC ......... G06F 16/24524; G06F 16/24545; G06F 16/283
  See application file for complete search history.

(56) References Cited

U.S. PATENT DOCUMENTS

| | | | |
|---|---|---|---|
| 6,769,017 B1 | 7/2004 | Bhat et al. | |
| 7,058,622 B1 | 6/2006 | Tedesco | |
| 8,762,366 B1* | 6/2014 | Becerra | G06F 16/2453 707/713 |
| 9,032,017 B1 | 5/2015 | Singh et al. | |
| 9,477,710 B2 | 10/2016 | Narasayya et al. | |
| 2005/0192937 A1* | 9/2005 | Barsness | G06F 16/24542 |
| 2008/0195577 A1* | 8/2008 | Fan | G06F 16/24545 |
| 2008/0270346 A1 | 10/2008 | Mehta et al. | |
| 2009/0254774 A1 | 10/2009 | Chamdani et al. | |
| 2010/0082603 A1 | 4/2010 | Krompass et al. | |
| 2011/0153662 A1 | 6/2011 | Stanfill et al. | |
| 2013/0226903 A1* | 8/2013 | Wu | G06F 16/24549 707/719 |
| 2014/0019415 A1 | 1/2014 | Barker et al. | |

(Continued)

OTHER PUBLICATIONS

U.S. Appl. No. 15/274,813, filed Sep. 23, 2016, Stavros Harizopoulos, et al.

(Continued)

*Primary Examiner* — Diedra McQuitery
(74) *Attorney, Agent, or Firm* — Robert C. Kowert; Kowert, Hood, Munyon, Rankin & Goetzel, P.C.

(57) ABSTRACT

Database queries may be performed using resources based on a determined size of the database query. Database query size may be dynamically determined for a database query when the query is received. The database query may be assigned to resources used for database queries of the determined size. In some embodiments, timeouts may be applied to reassign database queries to different resources if the performance of the database query exceeds a timeout threshold.

20 Claims, 10 Drawing Sheets

(56) References Cited

U.S. PATENT DOCUMENTS

2016/0203404 A1    7/2016  Cherkasova et al.
2017/0213257 A1*  7/2017  Murugesan ........ G06Q 30/0275
2017/0372230 A1*  12/2017  Kuromatsu ............ G06N 20/00
2018/0060132 A1    3/2018  Maru et al.

OTHER PUBLICATIONS

U.S. Appl. No. 16/102,545, filed Aug. 13, 2018, Bhaven Avalani.
U.S. Appl. No. 16/364,055, filed Mar. 25, 2019, Mingda Li.
U.S. Appl. No. 16/452,385, filed Jun. 25, 2019, Gaurav Saxena.
U.S. Appl. No. 16/435,402, filed Jun. 7, 2019, Stavros Harizopoulos.

* cited by examiner

USING COMPUTING RESOURCES TO PERFORM DATABASE QUERIES ACCORDING TO A DYNAMICALLY DETERMINED QUERY SIZE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Some types of data access requests require intensive computational and storage access workloads, while other types of data access requests may only involve small amounts of work to process. As data stores may have to process both high and low workload access requests, techniques to perform the different types of access requests may be implemented so that access request processing is optimally performed.

Figure 1:
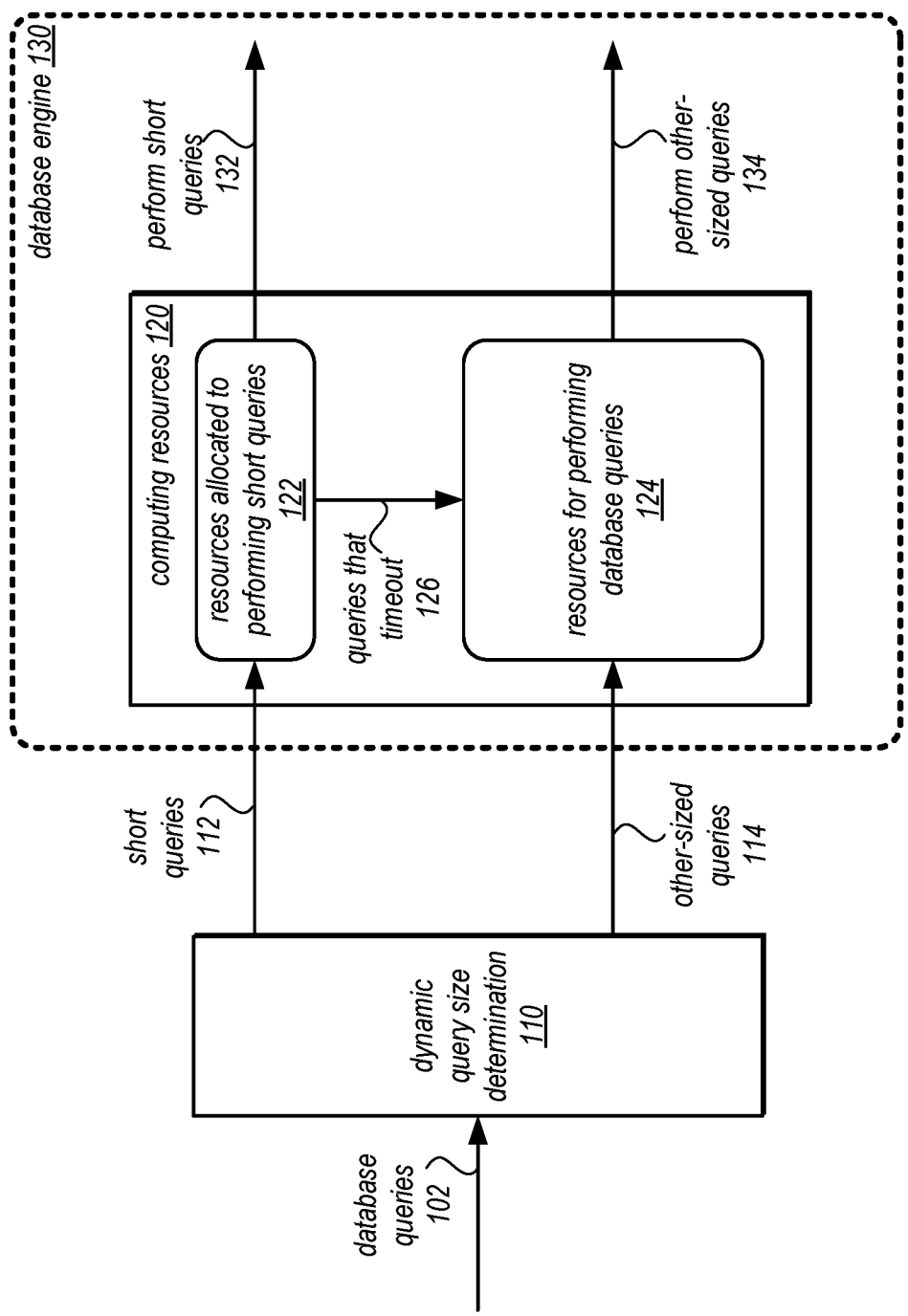
FIG. 1 is a logical block diagram illustrating using computer resources to perform database queries according to a dynamically determined query size, according to some embodiments

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of using computer resources to perform database queries according to a dynamically determined query size are described herein. Queries for data that satisfies various conditions or criteria, insertions, deletions, modifications, or any other request triggering processing based on a request to access a data store may utilize various processing resources, including various central processing units (CPUs), graphical processing units (GPUs), or other processing components that may execute various tasks to process database queries, in some embodiments. Because database queries may vary in terms of the workload placed upon the processing resources to execute the database query, in some embodiments, allocation of resources to different queries may affect the performance of the queries, in various embodiments. For example, the size of a database query which may indicate the amount of time to perform the database query could impact the performance of the query if it is performed concurrently or in competition with other differently sized queries (e.g., in scenarios where a short running time query may wait on resources used by a long running time query), in some embodiments. Therefore, using a size of queries to determine the use of resources to perform the query may improveme the performance of individual queries and the query processing system as a whole because the negative impacts of differently sized queries on other queries may be negated, in some embodiments.

FIG. 1 is a logical block diagram illustrating using computer resources to perform database queries according to a dynamically determined query size, according to some embodiments. Dynamic query size determination 110 may implement features to classify and/or otherwise determine a size of a database query 102 that is to be performed, before it is performed, in various embodiments. For example, as discussed below with regard to FIGS. 4, 6, and 7, size classifiers trained on the performance of previous database queries may be used to evaluate features of a received database query 102 and identify a probability that the query 102 is similar in size to a known size of a previous query, in some embodiments. These classification techniques may be dynamically updated, as discussed below in FIGS. 4 and 9 so that as the size of queries received changes over time, the dynamically determined size for a received query 102 may adjust accordingly (e.g., short queries may change from less than 5 seconds to less than 10 seconds over time). Queries classified as short queries 112, database engine 130 may be performed 132 using resources 130 that are allocated to performing short queries 122. For example, computing resources 130 may be logical resources (e.g., queues, execution slots, or other structures or allocations of physical resources on top of a virtualization platform, operating system, or application). In some embodiments, computing resources 130 may be separate hardware components, such as separate processors (or portions of processors), separate servers or systems, or other combinations of hardware. In at least some embodiments, the computing resources may be allocated to or reserved for a size (which may include a range of sizes of database query). Other-sized queries 114 (e.g., not classified as short) may be performed 134 using general resources for performing database queries 124. FIG. 5, discussed below, provides further examples of resource allocations amongst different sizes of queries, in some embodiments.

In at least some embodiments, queries can be misclassified. A timeout value may be applied to evict, remove, or reassign queries that timeout 126 from resources allocated to performing short queries 122 to resources for performing database queries 124, as discussed below with regard to FIG. 8. In this way, misclassification of a query's size may not be allowed to impact the performance of other queries which may be rightly characterized as "short" (e.g., by using resources allocated to performing short queries for a long time period). As with classifiers, timeouts may also be dynamically adjusted, as discussed below with regard to FIG. 9, in order to ensure that timeout values may adapt to changing sizes of queries that are submitted to database engine 130, in some embodiments.

Please note that the previous description of a database engine, dynamic query size determination, computing resources, allocation of computing resources, and performance of queries is a logical description and thus is not to be construed as limiting as to the implementation of a database engine, dynamic query size determination, computing resources, allocation of computing resources, and performance of queries, or portions thereof. For example, database engine 130 may be implemented as a cluster or group of nodes that perform data processing, such as discussed below with regard to FIGS. 2-4.

This specification begins with a general description of a provider network that implements database services (or other data storage or processing services) that may implement using computer resources to perform database queries according to a dynamically determined query size. Then various examples of one such database service, including different components/modules, or arrangements of components/module that may be employed as part of implementing the techniques are discussed. A number of different methods and techniques to implement using computer resources to perform database queries according to a dynamically determined query size, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
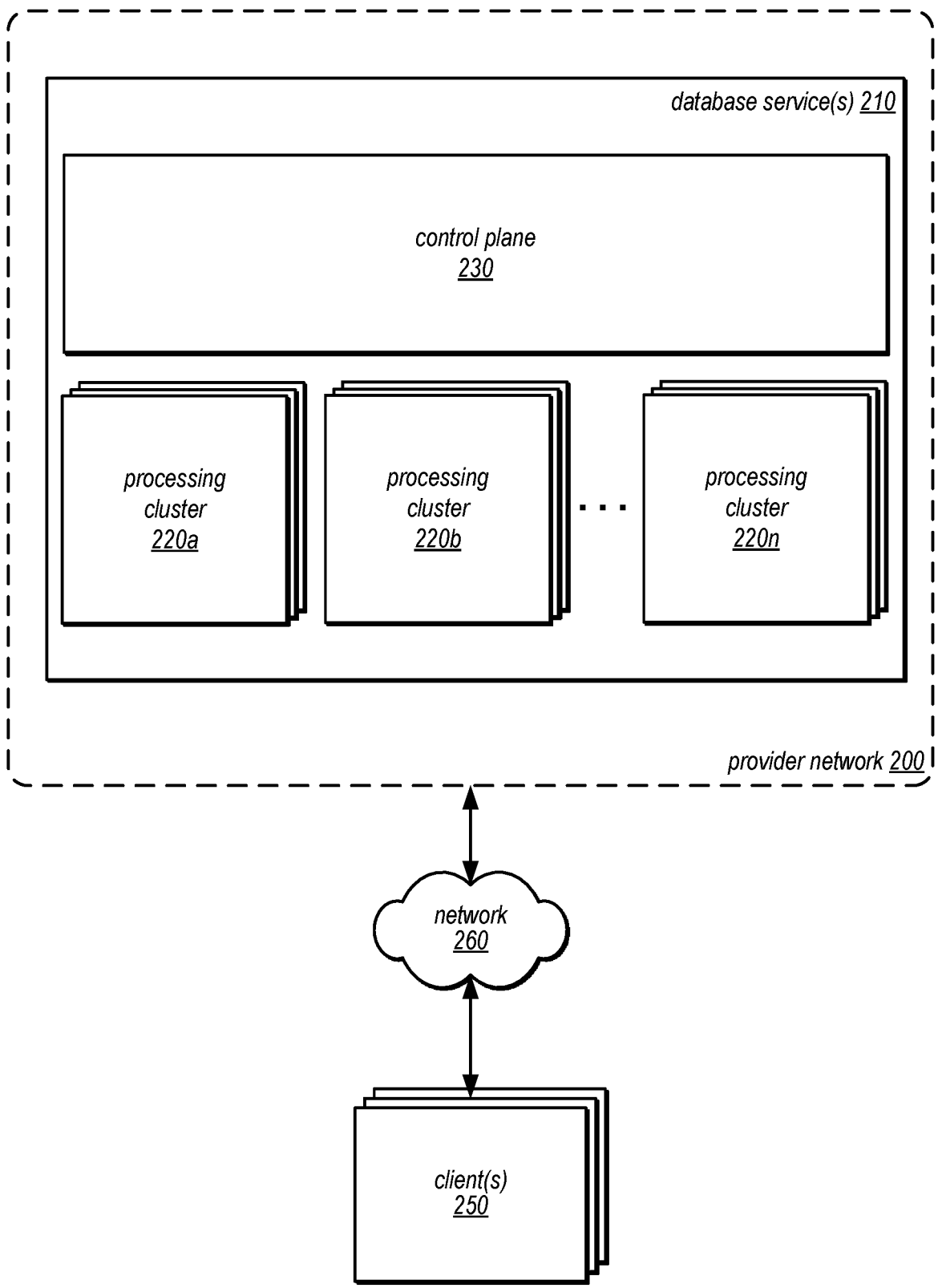
FIG. 2 is a logical block diagram illustrating a provider network offering a database service that implements using computer resources to perform database queries according to a dynamically determined query size for queries to databases hosted in the provider network, according to some embodiments.

FIG. 2 is a logical block diagram illustrating a provider network offering a database service that implements using computer resources to perform database queries according to a dynamically determined query size for queries to databases hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). A database service, such as database service 210, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node (as discussed below with regard to FIG. 3, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. Control plane 230 may direct scaling operations, as discussed above, to right-size a processing cluster 220 for efficiently processing queries.

Figure 3:
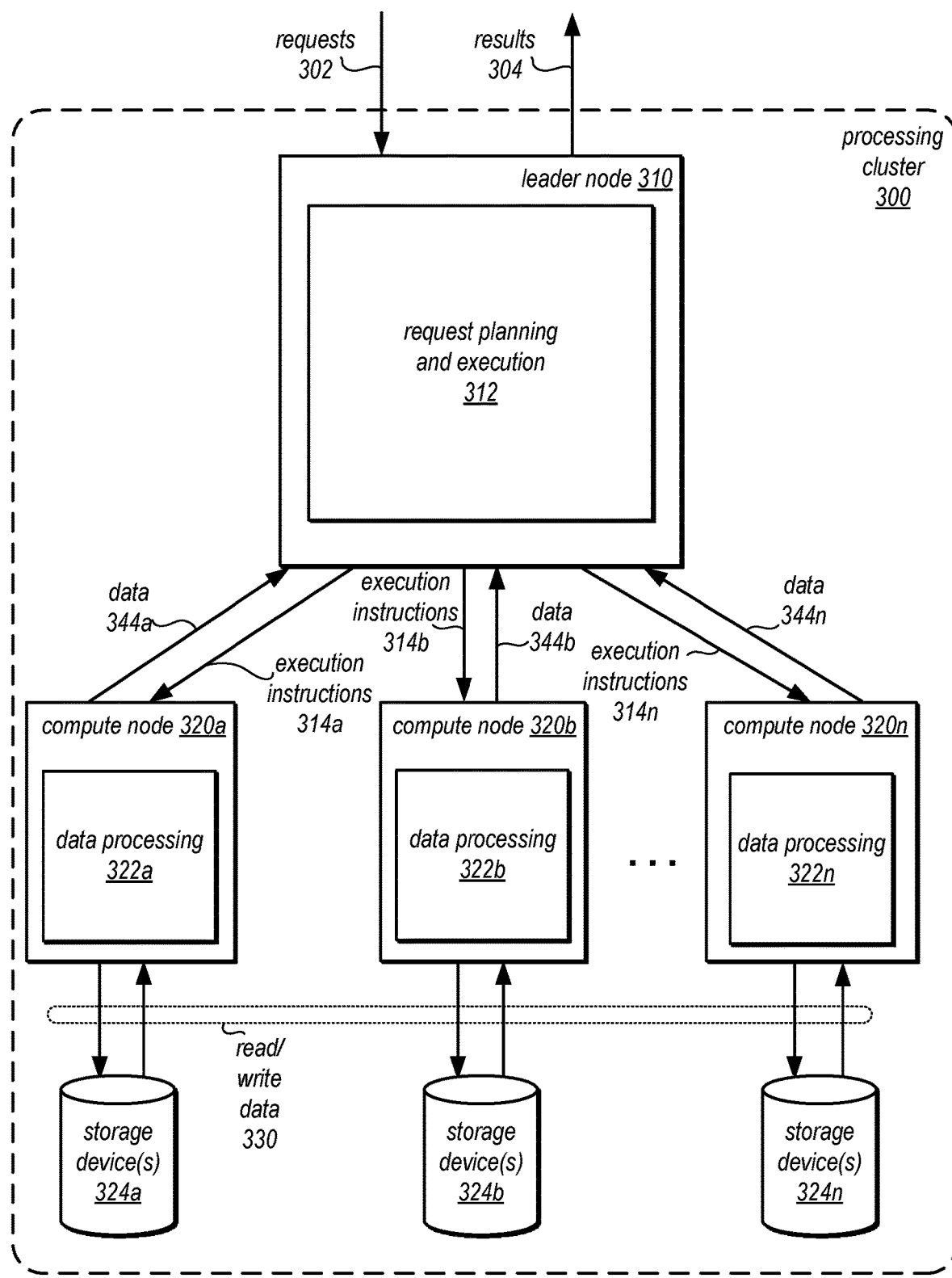
FIG. 3 is a logical block diagram illustrating a processing cluster of a database service that performs queries to a database hosted in the processing cluster, according to some embodiments.

FIG. 3 is a logical block diagram illustrating a processing cluster of a database service that performs queries to a database hosted in the processing cluster, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over an interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment. Leader node 310 may implement metric planning history/performance metric collection (not illustrated) to collect and report performance metrics collected for various events, units of work, or other portions a query or other operation's performance, compute node or leader node performance, and history of operations performed, such as join history which may be provided to generate join history graphs from a live database, in some embodiments. As described herein, each node in a processing cluster 300 may include attached storage, such as storage device(s) 324a, 324b, and 324n, on which a database (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing granular performance analysis for database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
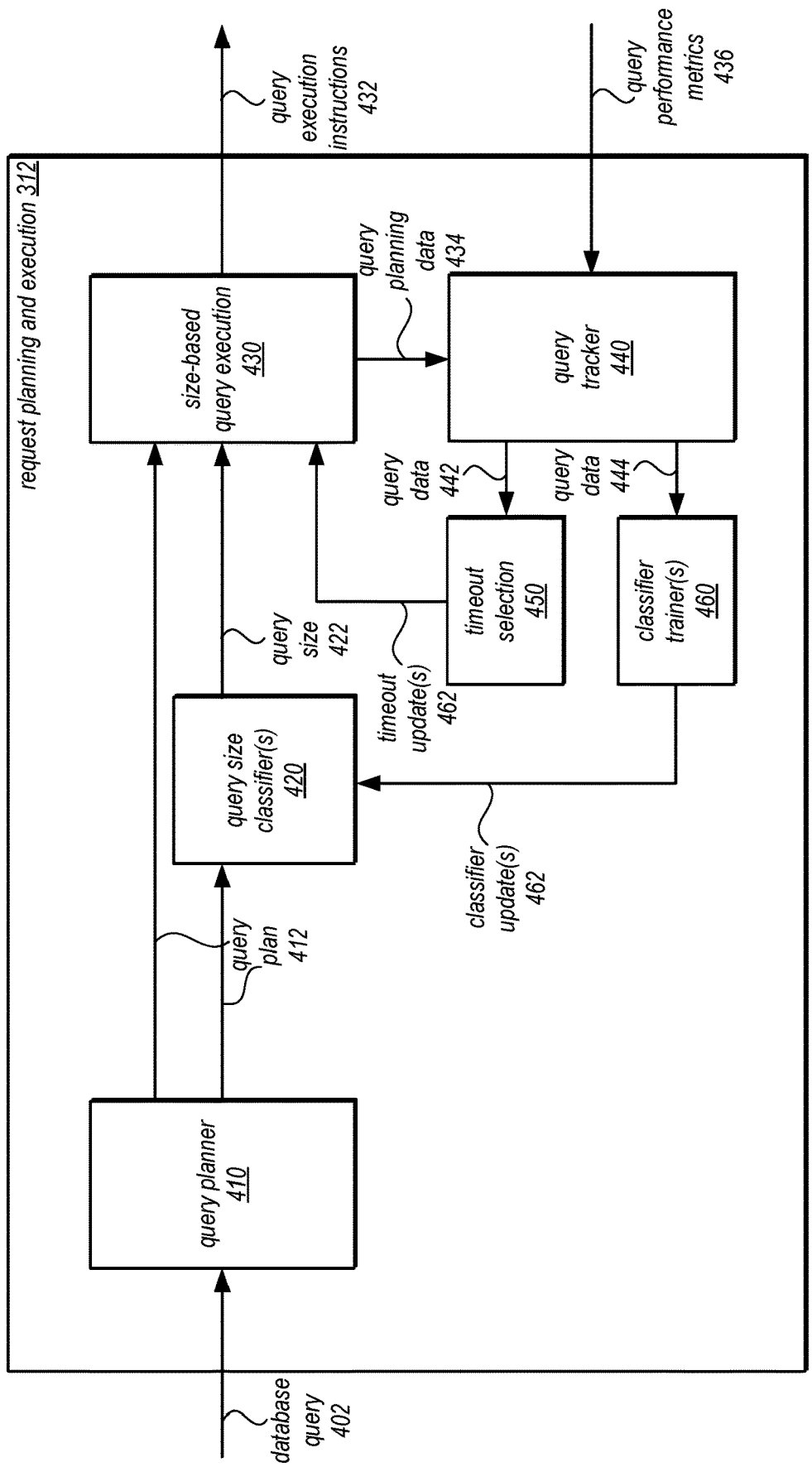
FIG. 4 is a block diagram illustrating request planning and execution that includes using computer resources to perform database queries according to a dynamically determined query size, according to some embodiments.
Figure 5:
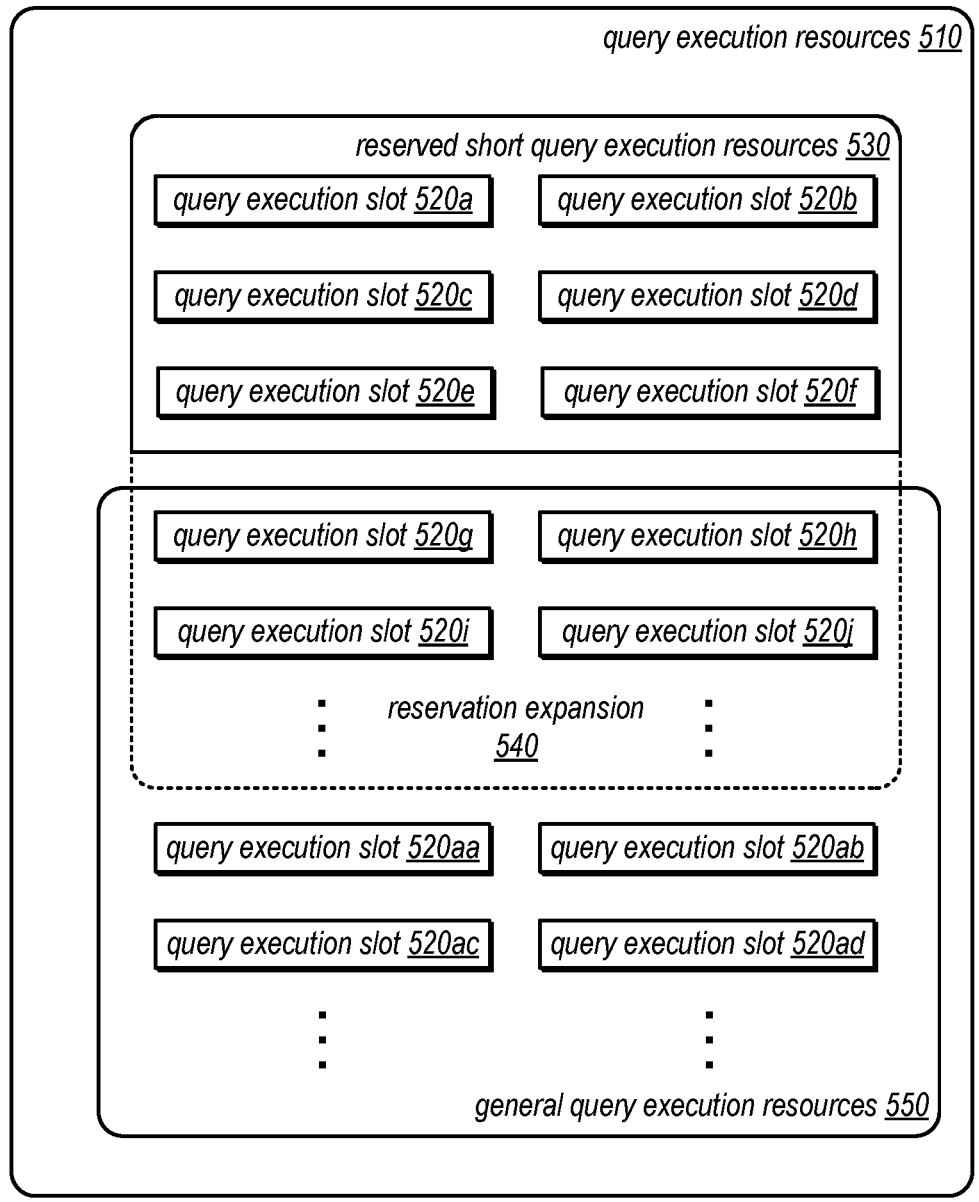
FIG. 5 is a logical block diagram illustrating computing resource allocations for different query sizes, according to some embodiments.

FIG. 4 is a block diagram illustrating request planning and execution that includes using computer resources to perform database queries according to a dynamically determined query size, according to some embodiments. As discussed above, request planning and execution 312 may receive database queries, such as database query 402, and direct the performance of the database query by issuing query execution instructions 432, in various embodiments. Request planning and execution 312 may implement a query planner 410, in various embodiments. Query planner 410 may perform various query planning techniques, such as generating a parse tree from a query statement, applying various rewrites or rules-based optimizations to modify the parse tree (e.g., reordering different operations such as join operations), generating different plans for performing the parsed/modified tree, and applying cost estimation techniques to determine estimated costs of the different plans in order to select a least costly plan as the query plan 412 to perform query 402.

Figure 6:
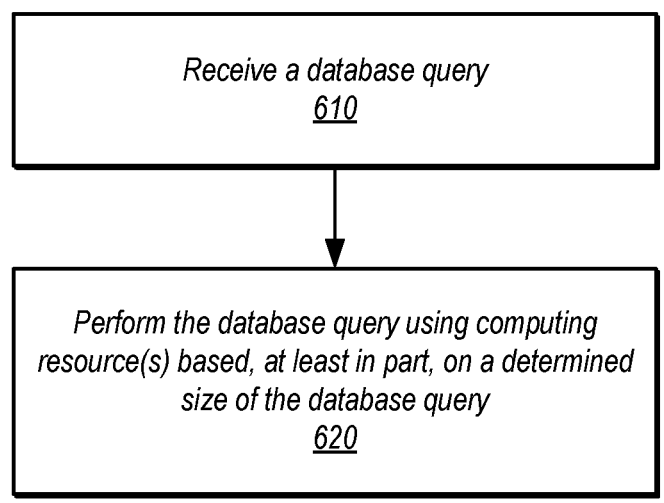
FIG. 6 is a high-level flowchart illustrating methods and techniques to use computer resources to perform database queries according to a dynamically determined query size, according to some embodiments.

Query plan 412 may be provided query size classifier(s) 420 which may apply one or more size classifiers to the query plan in order to classify a size of the query, as discussed in detail below with regard to FIGS. 6 and 7. In some embodiments, multiple classifiers may be used (e.g., to subdivide "short" queries into "short" and "very short" queries which may use different resources and/or be managed differently, in some embodiments). Query size classifier(s) 420 may output a query size 422 to size-based query execution 430 which may perform query plan 412 using resources allocated, reserved, and/or determined according to query size 422, as discussed below with regard to FIGS. 6, 7, and 8, in some embodiments. In at least some embodiments, size-based query execution may utilize probability indications of query size 422 for all queries to further optimize their performance according to query size 422. For example, size-based query execution 430 may order queries not classified as "short" in a queue for general resource execution slots, as discussed below with regard to FIG. 5, in order to apply an ordering that results in a shortest job first type of selection of queries from the queue. In some embodiments, size-based query execution 430 may apply timeouts to currently executing queries in reserved computing resources so that if a query turns out to have been misclassified (e.g., the query runs longer than the size determined for the query), then the query may be abort, and restarted using general processing resources, in some embodiments. In some embodiments, size-based query execution 430 may detect errors in query size classifier(s) 420, such as all queries being classified the same, and may trigger a retraining event for a query size classifier, in some embodiments.

Query tracker 440 may be implemented as part of request planning and execution 312 in order to track the performance of queries for updating timeouts and/or classifiers, in some embodiments. For example, query tracker may collect query planning data 434 (and other data such as size classification) from size-based query execution 430. Query performance metrics 436 may be collected from compute nodes in a processing cluster, in some embodiments. Query tracker 440 may provide the various query data 442 and 444 (which may be different in some embodiments) to timeout selection 450 and classifier trainers 460. As discussed below with regard to FIG. 9, timeout selection 450 may update timeout threshold values according to various techniques and provide the timeout updates 462 to size-based query execution 430 so that size-based query execution 430 will apply the updated timeout values, in some embodiments. Similarly, classifier trainer(s) 460 may receive query data to obtain the features for classifier trainer(s) 460 to update 462 query size classifiers 420 according to the various techniques discussed below with regard to FIG. 9.

FIG. 5 is a logical block diagram illustrating computing resource allocations for different query sizes, according to some embodiments. Query execution resources 510 may be allocated according to query execution slots 520, in some embodiments. Query execution slots 520 may, in some embodiments, be implemented as part of a queue (not illustrated). A query execution slot 520 may identify a process that is allocated a certain portion of computing resources (e.g., processor, memory, I/O bandwidth, network bandwidth, etc.) to perform a query assigned to that slot. As illustrated in FIG. 5, some query execution slots may be reserved for queries identified as short queries, as indicated at 530. A minimum number of query execution slots in reserved short query execution resources 530, such as slots 520a, 520b, 520c, 520d, 520e, and 520f, may be maintained so that only queries identified as short queries can be performed on the reserved slots 530. Although not illustrated, reserved resources may be further sub-divided (e.g., queries classified as "very short" for example may have query execution slots 520a and 520b reserved for them so that a "short" query that is not "very short" may only use one of those two query execution slots 520 if a "very short" query is not executing on the slots.

As discussed below with regard to FIG. 8, there may be some scenarios where the number of reserved query execution slots may be expanded by obtaining execution slots from general query execution resources 550. The number of query execution slots that may be obtained may be limited in some embodiments, according to a cap or other limitation on the number and/or time that general query execution resources can be reserved. For example, as illustrated in FIG. 5, reservation expansion 540 may include a limited number of slots, such as slots 520g, 520h, 520i, and 520j. Other slots, such as slots 520aa, 520ab, 520ac, 520ad may remain available for generation query execution (e.g., execution of queries of all sizes), in some embodiments. Please note that the example allocation schemes of resources for performing database queries according to a dynamically determined size can be implemented in different ways. For example, multiple different reserved resources for different query size classifications could be implemented in addition to resources for "short" queries, and thus the previous example is not intended to be limiting.

Although FIGS. 2-5 have been described and illustrated in the context of a database service, like a data warehousing system implementing a columnar relational database table, the various components illustrated and described in FIGS. 2-5 may be easily applied to other database or data storage systems that provide data processing on behalf of clients. As such, FIGS. 2-5 are not intended to be limiting as to other embodiments of a storage engine, query engine, processing cluster, or other component that may implement using computer resources to perform database queries according to a dynamically determined query size. FIG. 6 is a high-level flowchart illustrating methods and techniques to use computer resources to perform database queries according to a dynamically determined query size, according to some embodiments. Various different systems and devices may implement the various methods and techniques described below, either singly or working together. For example, a processing cluster, such as described above with regard to FIGS. 2-4 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a database query may be received, in various embodiments. The database query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the database query may be one query of many queries that can be submitted by one or many different users to a same database engine, processing platform, or system. For example, the database query may compete for computing resources along with other queries received from other users to be executed with respect to a database in some embodiments.

As indicated at 620, the database query may be performed using one or more computing resource(s) based, at least in part, on a determined size of the database query, in some embodiments. For example, computing resources may be logical resources (e.g., queues, execution slots, or other structures or allocations of physical resources on top of a virtualization platform, operating system, or application). In some embodiments, computing resources may be separate hardware components, such as separate processors (or portions of processors), separate servers, nodes, hosts, or systems, or other combinations of hardware. In at least some embodiments, the computing resources may be allocated to or reserved for a size (which may include a range of sizes of database query). For example, "short" database queries, as discussed below may be identified as a range (e.g., queries determined to run or perform in 5 seconds or less). In some embodiments, the size of a database query may be determined according to machine learning generated classifier as discussed below with regard to FIG. 7. In some embodiments, rules-based decision engines for classifying the size of a query may be applied instead of or in addition to the machine learning classifier (e.g., by checking to see if the query has been performed before and how long it performed, number of storage locations accessed, types of queries that cannot by definition be "short." In some embodiments, the use of computing resources according to size may be performed by employing one or more timeouts which may indicate that an initial size determination is not accurate (e.g., a determined "short" query running longer than the 5 second range of a "short" query). As discussed above with regard to FIG. 1, and below with regard to FIG. 8, if a timeout is exceeded, then the database query may be reassigned to different computing resources according to the updated classification of that query (e.g., because the query is longer than determined resources for longer queries may be utilized instead).

Figure 7:
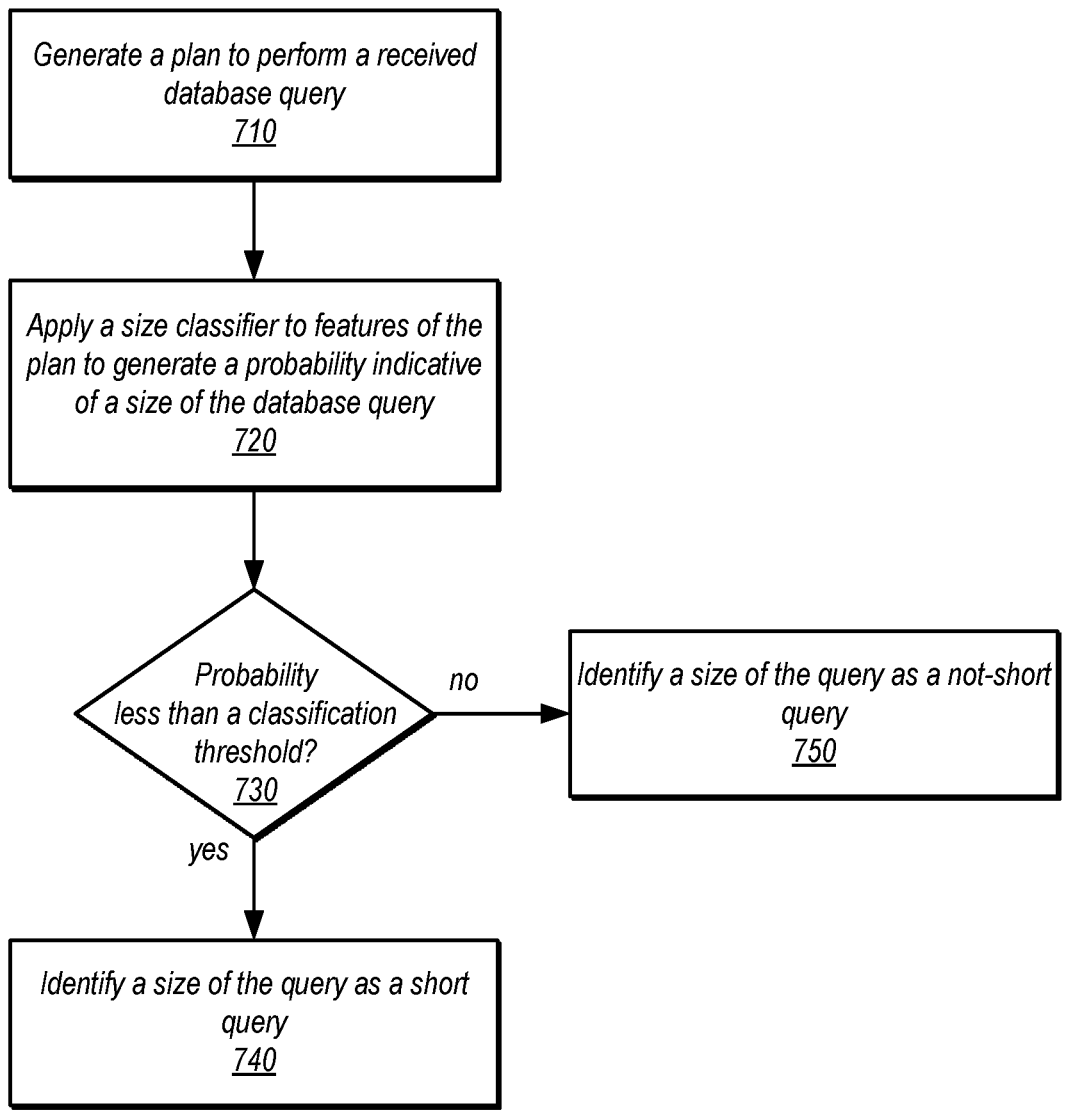
FIG. 7 is a high-level flowchart illustrating methods and techniques to dynamically determine a size for a database query, according to some embodiments.

FIG. 7 is a high-level flowchart illustrating methods and techniques to dynamically determine a size for a database query, according to some embodiments. As indicated at 710, a plan to perform a received database query may be generated, in some embodiments. For example, a query statement may be parsed into a parse tree, evaluated and/or reorganized according to one or more query planning rules (e.g., to rewrite operations more efficiently), and then evaluated to generate a plurality of possible query plans. Cost-based optimization may be implemented, in some embodiments, to select the least costly plan (e.g., according to estimates about the amount of data to be scanned, returned, shuffled or moved amongst nodes in a distributed processing cluster, etc.). The finally selected plan may then be considered for determining the size of the query, in some embodiments.

As indicated at 720, a size classifier may be applied to features of the plan to generate a probability indicative of a size of the database query, in some embodiments. For example, a linear classifier may be applied to score the features of the query plan according to a weighted sum of the features (e.g., by applying coefficients to the features determined from training the classifier according to logistic regression as discussed below). In some embodiments, other features in addition to the query plan may be considered, such as the source of the query (e.g., what user submitted the query), time of day, what table(s) are identified in the query, among others.

The output of the classifier may be a probability value, in various embodiments. The probability value may be compared to a classification threshold, as indicated at 730. For example, if the greater the probability value indicates the longer a query is likely to run and thus a greater size, then probabilities less than the classification threshold may be considered to indicate a short query, and thus as indicated at 740, a size of the query may be identified as a short query, in some embodiments. Alternatively, for those probabilities that exceed the classification threshold, the size of the query may be identified as a "not-short" query (which may still include a wide disparity in running times from 20 seconds to several hours), as indicated at 750.

Although FIG. 7 has been illustrated as applying one type of classifier, multiple classifiers may be used, in some embodiments. For example, "short" queries may be further divided into different classes, such as "very short" by applying a different classifier and threshold value, in some embodiments. In this way, further optimizations on how the different classes of "short" queries (or other size classifications) can be provided (e.g., by queuing those "short" queries that are not "very short" if no reserved execution slot is available).

Figure 8:
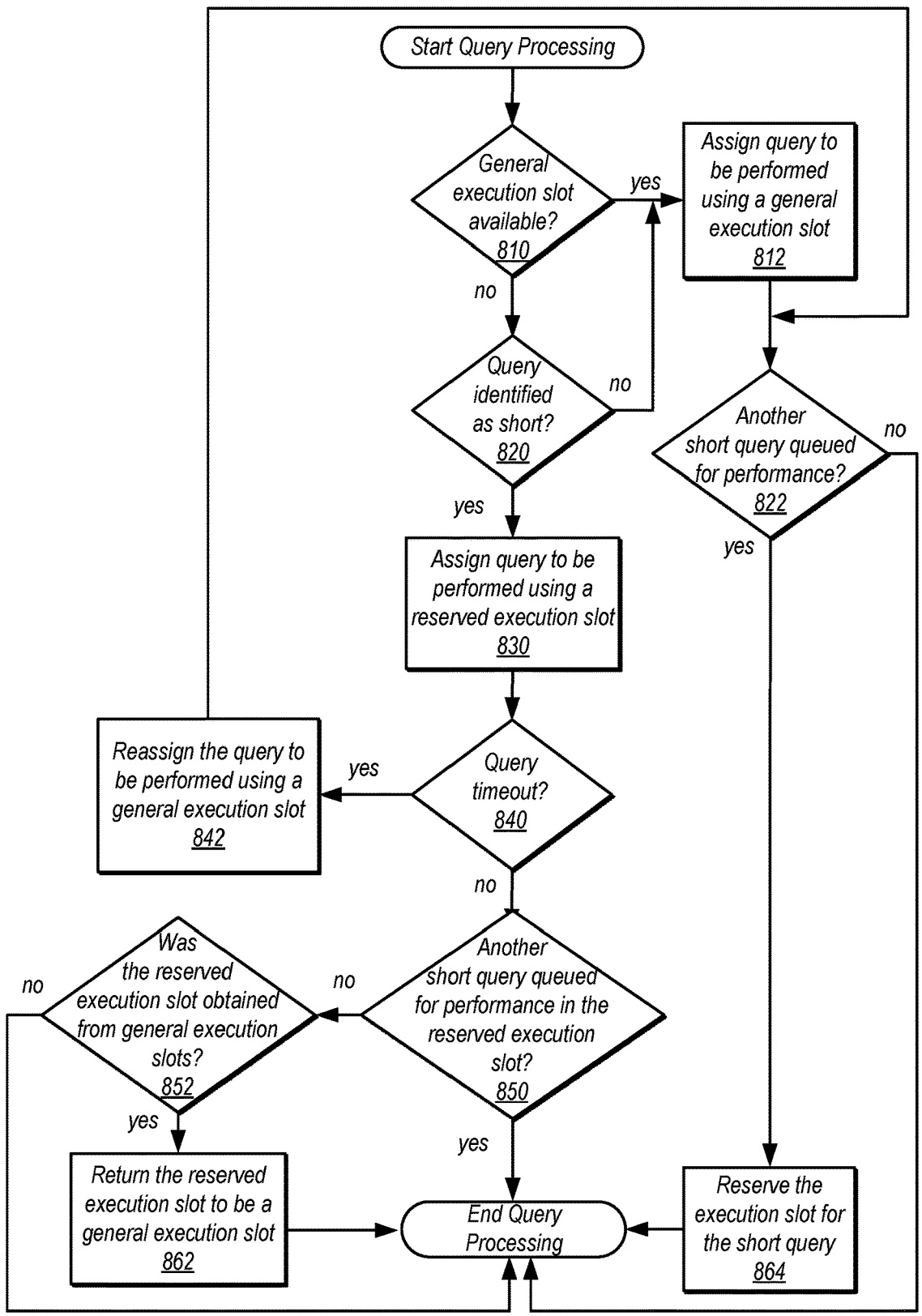
FIG. 8 is a high-level flowchart illustrating methods and techniques to assign queries to resources according to a dynamically determined size, according to some embodiments.

FIG. 8 is a high-level flowchart illustrating methods and techniques to assign queries to resources according to a dynamically determined size, according to some embodiments. Query processing may start when a database query is received. As indicated at 810, if a general execution slot is available, then the query may be assigned to be performed using the available general execution slot, in some embodiments (e.g., as no benefit may be accrued by using a reserved execution slot even if the query is short because the general execution slot can also begin work on the query with no queuing delay).

A dynamic determination of size may be performed in some embodiments (e.g., according to the techniques discussed above with regard to FIGS. 6 and 7). As indicated by the positive exit from 820, if the query is identified as short, then the query may be assigned to be performed using a reserved execution slot. In some embodiments, reserved execution slots may be obtained from or reserved out of an available general execution slot. In some embodiments, any query identified as a short query for which no existing reserved execution slots for queries are available may trigger the obtaining of a general execution slot to become a reserved execution slot. In some embodiments, the reservation of the additional execution slot may be limited to certain types of "short" queries. For example, if multiple classifiers are applied and the query is determined to have a "very short" size, then "very short" queries may trigger the expansion of reserved execution slots, whereas a "short" but not "very short" query may be placed in a queue for reserved execution slots, in some embodiments. In some embodiments where no expansion of reserved execution slots is performed, any "short" query may be maintained in a queue for reserved execution slots if none is available when the query is assigned.

If performing the query on the reserved execution slot exceeds a timeout, then as indicated by the positive exit from 840, the query may be reassigned to be performed using a general execution slot, as indicated at 842, in some embodiments. For example, if a general execution slot is available, then the query may be restarted using the available general execution slot. In the event that no general execution slots are available, the query may be queued for a next available general execution slot, in some embodiments. The queue may implement a shortest job first technique for pulling queries from the queue to begin performance. The probability or classification values determined for a query may be used to represent the amount of time to perform the job (e.g. the greater the value the greater the time) so that if the query is still estimated to be shorter than long running queries in the queue it may be selected and executed sooner according to the shortest job first selection technique. In some embodiments, queries in the queue for general resource execution slots may be ordered according to the time at which the queries were received (e.g., a timestamp indicating arrival time). In some scenarios multiple timeouts may be used, but only one may result in reassignment. For example, a timeout that indicates that queries which exceed the time out are not "very short" may not result in reassignment of a query but still may be used for tracking and training a "very short"

classifier, whereas a timeout for "short" queries may result in reassignment, in some embodiments.

If the query did not timeout, as indicated by the negative exit from 840, then the query may have completed, in various embodiments. A determination may be made as to whether another "short" query is queued from performance in the reserved execution slot, as indicated at 850 (e.g., by checking a short query queue). If so, then the reserved execution slot may be used by that other "short" query. If not, then as indicated by the negative exit from 850, a determination may be made as to whether the reserved execution slot was obtained from general execution slots (e.g., was originally a general execution slot that was obtained to expand the number of reserved execution slots), in some embodiments, as indicated at 852. If not, then the reserved execution slot may remain reserved for subsequently received "short" queries. If so, then as indicated by the positive exit from 852, the reserved execution slot may be returned to be a general execution slot, as indicated at 862. In this way, execution slots taken from general processing may be returned when no longer needed. However, in some embodiments, execution slots may be returned after a period of time for borrowing the execution slot has been exceeded (e.g., 15 minutes) so as not to treat the extra burst capacity provided by expansion as a permanent reassignment of the execution slot, in some embodiments.

For queries that are assigned to be performed using a general execution slot, as indicated at 812, a queue of queries may be maintained until a general execution slot is available. In some embodiments, the queue may be ordered, prioritized, or selected from according to the features of the queries in the queue. For example, a shortest job first selection technique may be applied to select the query in the queue with the smallest size as the next to be performed. As short queries may be added and placed in front of long queries, the size of queries that remain in a queue may be incrementally lowered so as to ensure that the longer queues are not starved or blocked and will eventually become the shortest job and selected, in some embodiments. When a query in a general execution slot is finished, a determination may be made as to whether a "short" query is queued for performance, as indicated at 822. If so, then the general execution slot may be used to expand the reserved execution slots by reserving the execution slot for the waiting "short" query, as indicated at 864.

Figure 9:
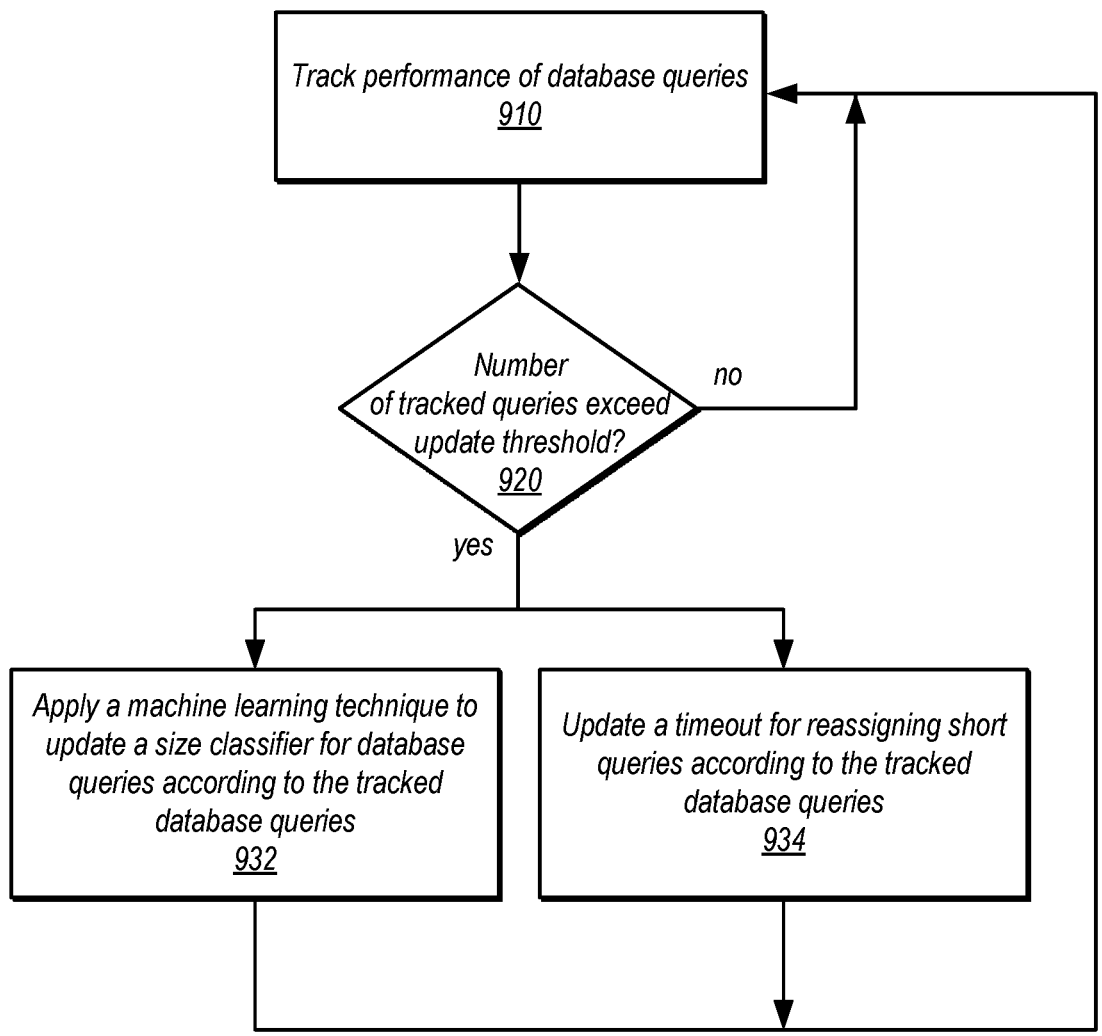
FIG. 9 is a high-level flowchart illustrating methods and techniques to update classifiers and timeouts for dynamically determining query sizes, according to some embodiments.

FIG. 9 is a high-level flowchart illustrating methods and techniques to update classifiers and timeouts for dynamically determining query sizes, according to some embodiments. As indicated at 910, performance of database queries may be tracked, in various embodiments. For example, as database queries are assigned to resources (e.g., as a short query at reserved resources or a long query at unreserved resources), the performance time and other information about the query may be stored, in some embodiments. The query plan or other features used to determine a size of the query may be stored, in some embodiments. Whether a timeout is exceeded by the query (e.g., if a single or multiple timeouts are succeeded) may be stored or otherwise tracked.

As the number of tracked queries grows an update threshold for the number of queries may be evaluated, as indicated at 920, in some embodiments. Tracking may continue until the number of tracked queries exceeds the update threshold (e.g., every 50, 100, or 1,000 additional database queries). As indicated by the positive exit from 920, once the update threshold is exceeded updates to a size classifier and/or a timeout for reassigning short queries to the tracked database queries may be performed. In some embodiments, different update thresholds (not illustrated) may be respectively evaluated for the size classifier and timeout (or between different size classifiers and different timeouts).

As indicated at 932, a machine learning technique may be applied to update a size classifier for database queries according to the tracked database queries, in some embodiments. For example, machine learning techniques that train linear classification models, such as logistic regression and/or gradient ascent, may be applied to the stored features of the tracked database queries, including features such as query plan operations (or nodes) like hash operations, hash join operations, aggregation operations, materialization operations, subquery scan operation, network operations, nested loop join operations or other query plan operations, a number of rows operated upon for each operation, a type of query (e.g., a "Select" query or Create Table as Select (CTAS) query), or distribution style of the database (e.g., hash distribution, even distribution, etc.), among others, and whether the database queries exceeded a timeout (e.g., one or multiple timeouts). Please note other types of classifiers, including non-linear classifiers generated from other machine learning techniques can be applied and thus the previous examples are not intended to be limiting. Different machine learning techniques and/or different features may be applied to update different classifiers (e.g., a "very short" classifier, a "short classifier," etc.), in some embodiments. In some embodiments, the machine learning technique may be applied only to the database queries received during the last tracking window (e.g., the last 50, 100, or 1,000 database queries) or may be cumulative to include all previous queries (or a larger set than the tracking window), in some embodiments.

As indicated at 934, a timeout for reassigning short queries may be updated according to the tracked database queries. For example, a timeout may be determined according to a technique that only considers data for those queries that were identified as "short" query by finding the $70^{th}$ percentile (P70) size per hour of the queries and identifying a timeout as the size of the P70 value. In some embodiments, multiple timeouts may be utilized and updated. For example, in addition to using the P70 value, a second timeout value may be determined by finding the maximum size value across a period of time (which may be the same or different than the window of queries considered for the other timeout) where the maximum size value is set as the second timeout. In some embodiments, minimum and maximum boundaries for time values may be enforced so that updates to the timeout do not lower or raise the timeout beyond the boundaries.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
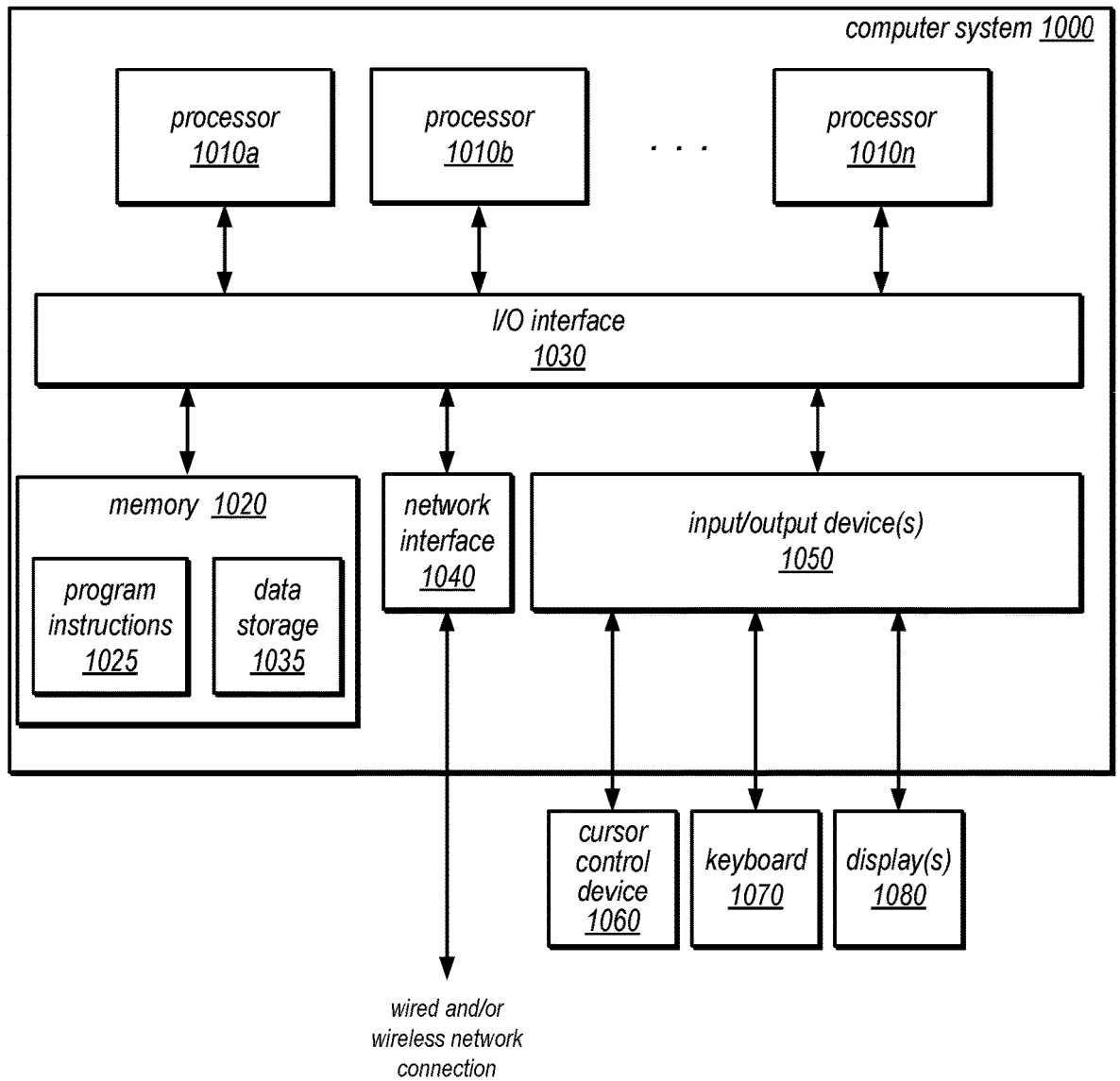
FIG. 10 illustrates an example system to implement the various methods, techniques, and systems described herein, according to some embodiments.

Embodiments of using computer resources to perform database queries according to a dynamically determined query size as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, if performed by at least one processor, cause the at least one processor to perform a method to at least:
   receive a database query;
   responsive to the database query:
   apply a size classifier to features of query plan generated to perform the database query, wherein the size classifier that is trained from a plurality of prior database queries according to a machine learning technique to output a probability that indicates a size of the database query; and
   perform the database query using one or more computer resources allocated to perform database queries of the indicated size of the database query.

2. The system of claim 1, wherein the program instructions further cause the at least one processor to perform the method to at least:
   receive a second database query;
   assign the second database query to be performed using one or more other computing resources allocated to perform database queries of a determined size of the second database query; and responsive to a determination that a performance time of the second database query exceeds a timeout threshold, reassign the second database query to be performed using one or more computing resources that are not allocated to the determined size of the second database query.

3. The system of claim 1, wherein the database query is received at a leader node of a processing cluster hosting a database in a data warehouse service offered by a provider network, wherein the one or more computing resources are one or more execution slots in the processing cluster that are reserved for processing database queries identified as short queries.

4. A method, comprising:
receiving a database query;
applying a size classifier to features of query plan generated to perform the query, wherein the size classifier is trained from a plurality of prior database queries according to a machine learning technique to output a probability that indicates a size of the database query; and
performing the database query using one or more computer resources based, at least in part, on the size of the database query.

5. The method of claim 4, further comprising:
updating the size classifier according to a plurality of additional database queries received after the database query; and
applying the updated size classifier to features of a query plan generated to perform another database query to determine the size of the other query, wherein the other query is performed using one or more computing resources according to the determined size of the other query.

6. The method of claim 4, further comprising:
applying a second size classifier to the features of query plan generated to perform the query, wherein the second size classifier is trained to output a probability that the query is a different size than the size classifier; and
wherein performing the database query using one or more computer resources is further based on the probability that the query is the different size.

7. The method of claim 4, wherein the size classifier is applied to respective query plans for a plurality of other database queries output respective probabilities that indicates the respective sizes of the other database queries, and wherein the method further comprises assigning the other database queries to respective computing resources to perform the other database queries according to the respective probabilities.

8. The method of claim 4, further comprising:
receiving a second database query;
assigning the second database query to be performed using one or more other computing resources allocated to perform database queries of a determined size of the second database query; and
responsive to a determination that a performance time of the second database query exceeds a timeout threshold, reassigning the second database query to be performed using one or more computing resources that are not allocated to the determined size of the second database query.

9. The method of claim 8, further comprising:
responsive to a determination that a number of additional database queries exceeds an update threshold for the timeout threshold, updating the timeout threshold according to an evaluation of the additional database queries received after the database query.

10. The method of claim 4, wherein performing the database query using the one or more computer resources comprises reserving the one or more resources from a set of unreserved computing resources for database queries of the determined size.

11. The method of claim 4, wherein the one or computing resources used to perform the database query are reserved for database queries of the determined size, and wherein the method further comprises:
receiving a second database query; and
performing the second database query using one or more other computer resources not reserved for performing database queries according to a determined size of the second database query.

12. A non-transitory, computer-readable storage medium, storing program instructions that when executed by one or more computing devices cause the one or more computing devices to implement:
receiving a database query;
responsive to the database query:
applying a size classifier to features of query plan generated to perform the query, wherein the size classifier is trained from prior database queries according to a machine learning technique to output a probability that indicates a size of the database query; and
performing the database query using one or more computer resources based, at least in part, on the indicated size of the database query.

13. The non-transitory, computer-readable storage medium of claim 12, wherein the program instructions cause the one or more computing devices to further implement:
responsive to a determination that a number of additional database queries exceeds an update threshold for the size classifier, updating the size classifier according to the additional database queries received after the database query; and
applying the updated size classifier to features of a query plan generated to perform another database query to determine the size of the other query, wherein the other query is performed using one or more computing resources according to the determined size of the other query.

14. The non-transitory, computer-readable storage medium of claim 12, wherein the program instructions cause the one or more computing devices to further implement:
receiving a second database query;
assigning the second database query to be performed using one or more other computing resources allocated to perform database queries of a determined size of the second database query; and
responsive to a determination that a performance time of the second database query exceeds a timeout threshold, reassigning the second database query to be performed using one or more computing resources that are not allocated to the determined size of the second database query.

15. The non-transitory, computer-readable storage medium of claim 12,
wherein, in performing the database query using the one or more computer resources, the program instructions cause the one or more computing devices to further implement reserving the one or more resources from a set of unreserved computing resources for database queries of the determined size; and wherein the program instructions cause the one or more computing devices to further implement returning the one or more resources to be unreserved computing resources for database queries.

16. The non-transitory, computer-readable storage medium of claim 12, wherein the one or computing resources used to perform the database query are reserved for database queries of the determined size, and wherein the program instructions cause the one or more computing devices to further implement:

receiving a second database query; and performing the second database query using one or more other computer resources not reserved for performing database queries according to the determined size of the second database query.

17. The non-transitory, computer-readable storage medium of claim 12, wherein the database query is received at a database service hosted in a provider network, wherein the one or more computing resources are compute nodes allocated to performing queries of the determined size.

18. The system of claim 1, wherein the size classifier is applied to respective query plans for a plurality of other database queries output respective probabilities that indicates the respective sizes of the other database queries, and wherein the method further comprises assigning the other database queries to respective computing resources to perform the other database queries according to the respective probabilities.

19. The system of claim 1, wherein the database query is received at a database service hosted in a provider network, wherein the one or more computing resources are compute nodes allocated to performing queries of the determined size.

20. The system of claim 1, wherein the program instructions further cause the at least one processor to perform the method to at least:

responsive to a determination that a number of additional database queries exceeds an update threshold for the timeout threshold, update the timeout threshold according to an evaluation of the additional database queries received after the database query.

\* \* \* \* \*